United States Patent
Kobayashi et al.

(10) Patent No.: US 11,535,127 B2
(45) Date of Patent: Dec. 27, 2022

(54) INTERIOR STRUCTURE OF VEHICLE

(71) Applicant: Toyota Jidosha Kabushiki Kaisha, Toyota (JP)

(72) Inventors: Ippei Kobayashi, Okazaki (JP); Yoichi Tamura, Nisshin (JP); Takahiko Aoki, Nisshin (JP); Mitsuhiro Hamada, Kariya (JP); Ryouhei Kawagishi, Miyagi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 16/433,190

(22) Filed: Jun. 6, 2019

(65) Prior Publication Data

US 2019/0375315 A1     Dec. 12, 2019

(30) Foreign Application Priority Data

Jun. 8, 2018  (JP) .............................. JP2018-110483

(51) Int. Cl.
  *B60N 2/42* (2006.01)
  *B60N 2/68* (2006.01)
  *B60N 2/75* (2018.01)
  *B60N 2/90* (2018.01)

(52) U.S. Cl.
  CPC ............ *B60N 2/4235* (2013.01); *B60N 2/68* (2013.01); *B60N 2/79* (2018.02); *B60N 2/986* (2018.02)

(58) Field of Classification Search
  CPC ..................................................... B60N 2/68
  See application file for complete search history.

(56) References Cited

U.S. PATENT DOCUMENTS

| | | | |
|---|---|---|---|
| 5,407,244 A | 4/1995 | Nakano et al. | |
| 5,507,554 A | 4/1996 | Nakano et al. | |
| 5,716,094 A * | 2/1998 | Bhalsod | B60N 2/4235 296/187.12 |
| 6,199,252 B1 * | 3/2001 | Masters | B60N 2/0224 29/91.1 |
| 2004/0195873 A1 * | 10/2004 | Saberan | B60N 2/4249 297/216.13 |
| 2006/0152060 A1 * | 7/2006 | Nagayama | B60R 21/20 297/452.18 |
| 2009/0021061 A1 * | 1/2009 | Yamaki | B60N 2/4249 297/216.13 |

(Continued)

FOREIGN PATENT DOCUMENTS

| | | |
|---|---|---|
| CN | 102310794 A | 1/2012 |
| DE | 102008044188 B4 | 3/2012 |

(Continued)

*Primary Examiner* — David R Dunn
*Assistant Examiner* — Christopher E Veraa
(74) *Attorney, Agent, or Firm* — Dinsmore & Shohl LLP

(57) ABSTRACT

A seat mounted in the cabin of a vehicle has side supports for supporting the respective right and left lateral sides of the upper half body of an occupant. The seat also has a seat frame and a side support frame incorporated in the side support on the inner side in the vehicle width direction and secured on the seat frame. A console box is mounted adjacent to the seat, on the inner side of the seat in the vehicle width direction. The side support frame and the console box or the console frame are positioned so as to at least partially overlap each other in a side view.

9 Claims, 5 Drawing Sheets

(56) References Cited

U.S. PATENT DOCUMENTS

| | | | | |
|---|---|---|---|---|
| 2011/0298267 A1* | 12/2011 | Yamaki | ............... | B60N 2/682 |
| | | | | 297/391 |
| 2012/0013108 A1* | 1/2012 | Yamaki | ............... | B60N 2/68 |
| | | | | 280/730.2 |
| 2012/0098305 A1* | 4/2012 | Yamaki | ............... | B60N 2/686 |
| | | | | 297/216.14 |
| 2013/0113246 A1* | 5/2013 | Kaku | ............... | B60N 2/4228 |
| | | | | 297/216.14 |
| 2013/0270878 A1* | 10/2013 | Adachi | ............ | B60N 2/42745 |
| | | | | 297/216.14 |
| 2015/0032037 A1* | 1/2015 | Nakano | ............... | A61H 23/02 |
| | | | | 601/46 |
| 2015/0360596 A1* | 12/2015 | Eisenbraun | .......... | B60R 21/207 |
| | | | | 296/64 |
| 2018/0319301 A1* | 11/2018 | Haby | ............... | B60N 2/6009 |

FOREIGN PATENT DOCUMENTS

| | | | |
|---|---|---|---|
| JP | H05301551 | A | 11/1993 |
| JP | 2009-096216 | A | 5/2009 |
| JP | 2011-230686 | A | 11/2011 |

\* cited by examiner

INTERIOR STRUCTURE OF VEHICLE

CROSS REFERENCE TO RELATED APPLICATION

This application claims priority to Japanese Patent Application No. 2018-110483 filed on Jun. 8, 2018 which is incorporated herein by reference in its entirety including the specification, claims, drawings, and abstract.

TECHNICAL FIELD

The present disclosure relates to the interior structure of a vehicle, and in particular to the structures of a seat and a console disposed adjacent to the seat.

BACKGROUND

Conventionally, various measures against side collision of vehicles have been suggested. Patent Document 1 below discloses a lower inside impact transmission block (25) mounted to the side of a seat (1) so as to be positioned on the extension of a lower cross member (20) of the seat (1). The lower inside impact transmission block (25) is opposed to a lateral surface of the console box (5). An impact applied to the seat (1) at a side collision is transmitted via the lower inside load transmission block (25) and the console box (5) to the floor tunnel (12). Note that the numbers in the parentheses above correspond to the reference numerals used in Patent Document 1 below, and have no relationship with the reference numerals referred to in the embodiments of this application.

CITATION LIST

Patent Literature

PATENT DOCUMENT 1: JP 2011-230686A

SUMMARY

There is demand to reduce the amount of motion, or to implement a small motion, of an occupant of a vehicle to be caused at a side collision; more particularly, at a side collision of the vehicle from the side opposite from the seat of the occupant. The technique disclosed in Patent Document 1 mentioned above enables restriction of the motion of a seat but not the motion of the upper half body of the occupant.

It is thus an object of the present disclosure to reduce the amount of motion, or to implement a small motion, of the upper half body of an occupant of a vehicle to be caused at a side collision from the side opposite from the seat of the occupant.

According to one aspect of the present disclosure, there is provided an interior structure, or a structure inside the cabin, of a vehicle, the interior structure including: a seat and a console box, in which the seat is mounted in the cabin of the vehicle, and has side supports for supporting the respective right and left lateral sides of the upper half body of an occupant, and the console box is disposed adjacent to the seat, on the inner side of the seat in the vehicle width direction. The seat includes a seat frame and a side support frame incorporated in the side support on the inner side in the vehicle width direction and secured on the seat frame. The side support frame and the console box are positioned so as to at least partially overlap each other in a side view.

At a side collision from a side opposite from the side of a seat of interest (hereinafter referred to as a far-side collision), the seat, more particularly, a lateral surface of the seat back, crashes against the console box. Disposition of a side support frame inside a side support of the seat back so that the side support frame abuts against the console box at a far-side collision enables restriction of the motion of the side support frame by the console box. This structure enables restriction of the sideward motion of the upper half body of an occupant on the seat by the side support.

In an embodiment of the present disclosure, the console box may include a console frame secured on the floor tunnel of the vehicle. The console frame can enhance the rigidity of the console box, which structure can further restrict the motions of the side support frame and of an occupant at a far-side collision.

In an embodiment of the present disclosure, the console frame may be positioned so as to at least partially overlap the side support frame in a side view. The console frame can directly support the side support frame. This structure enables further restriction of the motions of the side support frame and of an occupant at a far-side collision.

In an embodiment of the present disclosure, the side support frame may be secured on a lateral surface of the seat back frame of the seat frame. As compared with a case in which the side support frame is secured on the front of the seat back frame, a larger overlapping area of the side support frame and the console box or the console frame can be ensured. This structure enables further restriction of the motions of the side support frame and of an occupant at a far-side collision.

In an embodiment of the present disclosure, the side support frame may be provided to the driver seat.

A side support frame is disposed inside the side support of a seat so that the side support frame can be supported by a console box at a far-side collision. This structure enables restriction of the motion of the side support frame at a far-side collision. As a result, it is possible to reduce the amount of motion, or to implement a small motion, of the upper half body of the occupant to be caused at such a collision.

BRIEF DESCRIPTION OF DRAWINGS

Embodiment(s) of the present disclosure will be described by reference to the following figures, wherein.

DESCRIPTION OF EMBODIMENTS

Figure 1:
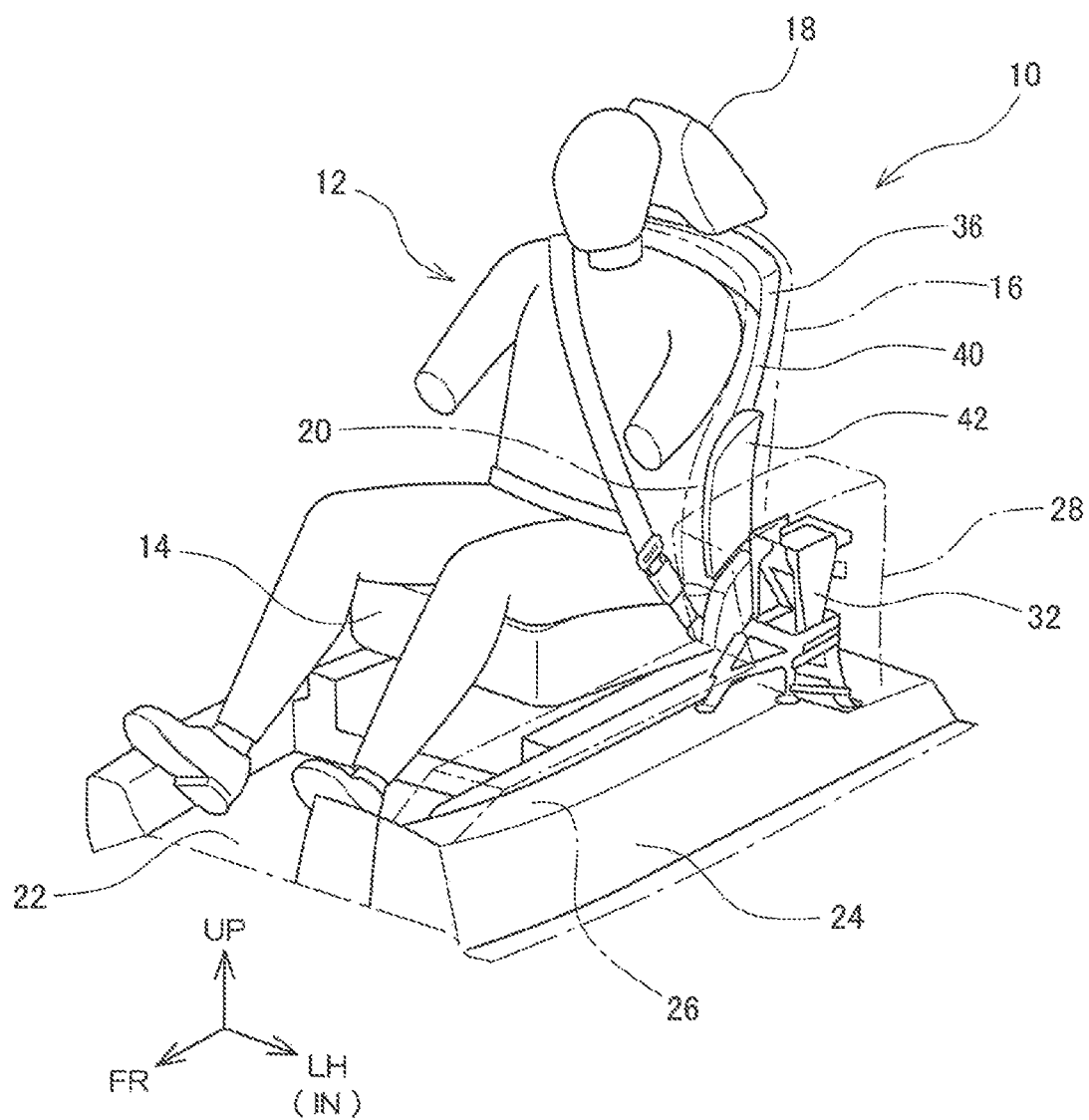
FIG. 1 is a schematic perspective view of the interior structure in an area near a driver seat.
Figure 2:
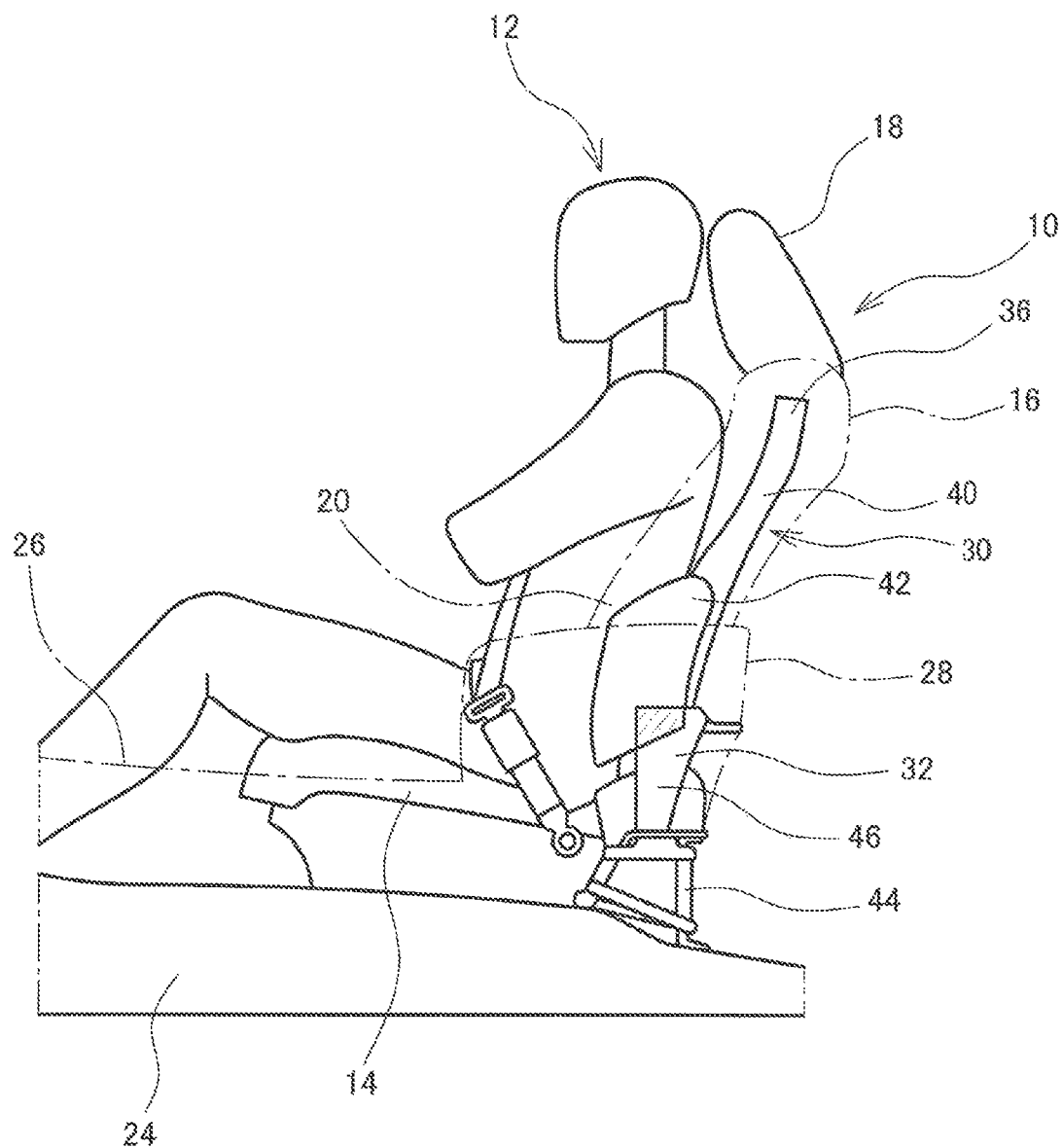
FIG. 2 is a schematic side view of a driver seat and its nearby area.

Embodiments of the present disclosure will now be described by reference to the attached drawings. FIGS. 1 and 2 illustrate the right seat 10 of a vehicle as viewed from the moving direction of the vehicle (that is, a driver seat of a right-hand vehicle), and a human body dummy imitating an occupant 12 on the seat 10. FIG. 1 is a perspective view, FIG. 2 is a side view from the left side of the vehicle. In the following description, terms indicating directions or orientations, such as front, forward, back, backward, right and left, side or lateral, up or above, upward, down, and downward, indicate those relevant to a vehicle unless otherwise stated. A side in the right-left direction of a vehicle (the vehicle width direction) closer to the center line of a vehicle extending in the front-back direction of the vehicle is referred to as the inner side in the vehicle width direction; a side farther from the center line is referred to as an outer side in the vehicle width direction. In the respective drawings, an arrow FR points at the front side; an arrow UP points at the up side; an arrow LH points at the left side; and an arrow IN points at the inner side in the vehicle width direction.

The seat 10 includes a seat cushion 14 for supporting the hips of the occupant 12 and a seat back 16 for supporting the upper half body of the occupant 12 from the back of the occupant 12. The seat back 16 has a head rest 18 attached on the upper portion of the seat back 16, for supporting the head of the occupant 12. The seat back 16 further has side supports 20 attached near the right and left respective lateral edges of the seat back 16 and extending forward for supporting the upper half body of the occupant; in particular, the lateral sides of his/her waist. In FIGS. 1 and 2, the seat back 16 is outlined with an alternate long and short dash line to depict the inside structure of the seat back 16, while a major part of the inside structure is depicted with a solid line. The seat 10 is mounted on a floor 22. A floor tunnel 24 is formed on the inner side in the vehicle width direction in the area with the seat 10. The floor tunnel 24 protrudes from the base surface of the floor 22, and extends in the front-back direction between the right and left seats.

A center console 26 is mounted on the floor tunnel 24; that is, between the driver seat and the passenger seat. The center console 26 has, for example, a shift lever, a parking brake lever, a cup holder, various switches, and a storage box. In addition, a console box 28 is mounted on a rear portion of the center console 26; that is, between the seat backs of the right and left respective seats, for storing small items. The console box 28 is positioned higher than the remaining portion of the center console 26 so as to overlap the hips and at least a part of the waist of the occupant seated in a side view. In FIGS. 1 and 2, the center console 26 is outlined with an alternate long and short dash line to depict the inside structure of the center console 26, while a major part of the inside structure is depicted with a solid line.

Figure 3:
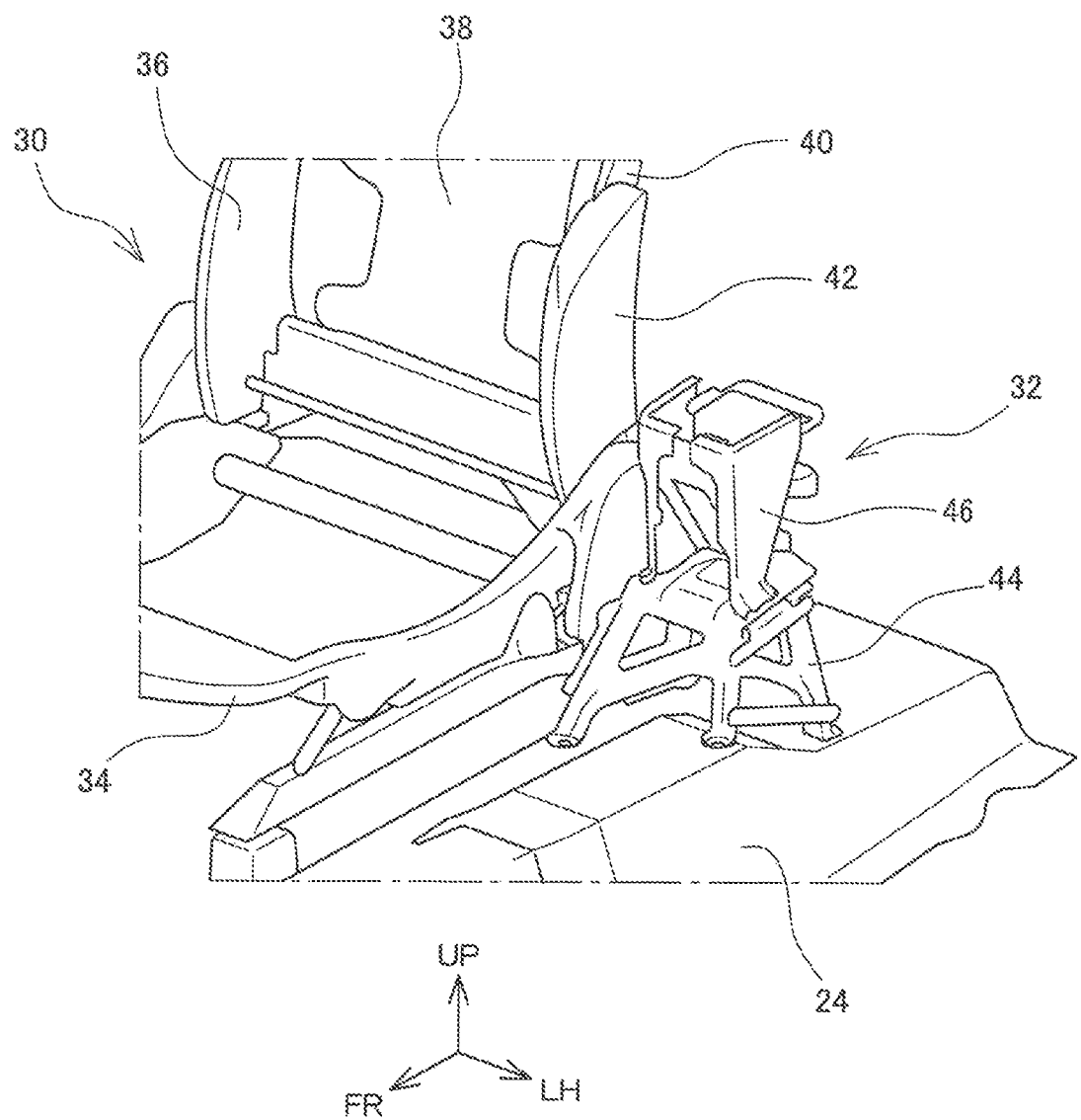
FIG. 3 illustrates the inside structures of the driver seat and a center console.

The types of human body dummies imitating an occupant 12 for use in collision tests are predetermined for every type of test. In side collision tests, AM50, or a dummy having a body of average American males, is normally used. Respective adjustment mechanisms, such as mechanisms for the position of the seat 10 in the front-back direction, the height of the seat cushion 14, and the inclination angle of the seat back 16, or the like, are adjusted in advance in accordance with the type of the human body dummy in use. FIG. 3 illustrates a seat frame 30 of the seat 10 and a console frame 32 incorporated in the center console 26. Referring to FIGS. 1 to 3, the inside structures of the seat 10 and the center console 26 will be described.

The seat frame 30 is a strength member that constitutes the framework of the seat 10. A typical seat frame 30 is formed by combining members such as pipes, pressed steel plates, or resin materials. The seat frame 30 includes a seat cushion frame 34 and a seat back frame 36, which are framework members of the seat cushion 14 and the seat back 16, respectively. The seat back frame 36 is a frame in a substantially quadrangular shape, with a seat back spring 38 disposed inside the quadrangle. The seat back frame 36 and the seat back spring 38 are covered with a seat cover pad (not illustrated) made of flexible and soft material, such as soft urethane foam. Such covered seat back frame 36 and seat back spring 38 are further covered with a seat cover member.

Figure 4:
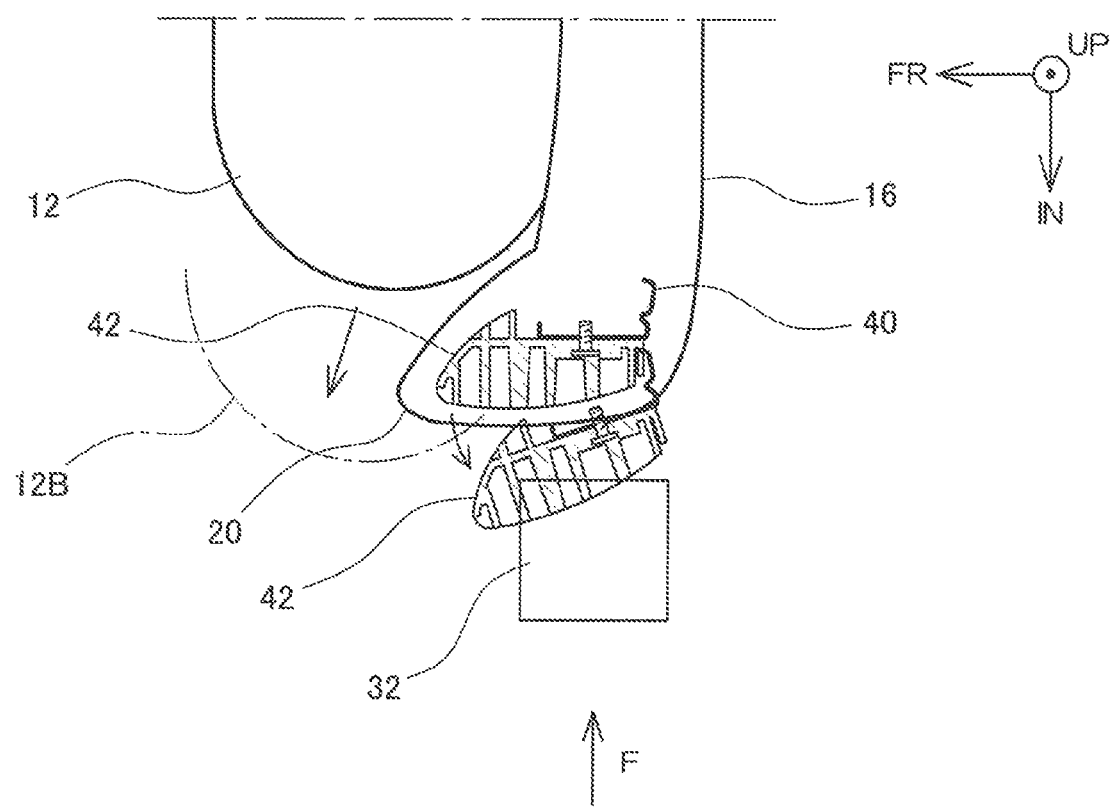
FIG. 4 is a schematic horizontal cross sectional view illustrating motions of a side support frame and of an occupant at a far-side collision.

Of the members extending along the vertical edges of the quadrangular seat back frame 36; that is, in the up-down direction, a member disposed on the inner side in the vehicle width direction (hereinafter referred to as an inside vertical member) 40 has a side support frame 42 secured thereon. The side support frame 42 may be made of hard resin. The side support frame 42 has a plurality of ribs as illustrated in FIG. 4, and may have an enveloped outer shape defined by the tip ends of the ribs. The side support frame 42 may have either a hollow or solid structure. The side support frame 42 is mounted on the face of the inside vertical member 40, the face directed inward in the vehicle width direction, and fixed with a bolt whose head is buried in the side support frame 42 and a nut screwed with the bolt. The side support frame 42 is incorporated in the side support 20 on the inner side in the vehicle width direction. The side support frame 42 is harder than the seat cover pad so that higher rigidity of the side support 20 can be achieved. The side support frame 42 is disposed at least partially overlapping the console box 28 in a side view. The face of the side support frame 42 facing the console box 28 is positioned closer to the console box 28 than is the inside vertical member 40 of the seat back frame 36. Another vertical member of the seat back frame 36; that is, a vertical member disposed on the outer side in the vehicle width direction, does not have a side support frame 42.

The console frame 32 is fixedly mounted on the floor tunnel 24 with a fastener, such as a bolt, or through welding. The console frame 32 is incorporated in the console box 28 so that enhanced rigidity of the console box 28 can be achieved. The console frame 32 may be made using a pressed steel plate. The console frame 32 may include a lower frame 44 securely mounted on the upper surface of the floor tunnel 24 and an upper frame 46 securely mounted on the lower frame 44. The console frame 32 may be integrally formed.

As illustrated in FIG. 2, the upper end of the console frame 32 is positioned higher than the lower end of the side support frame 42. The console frame 32 and the side support frame 42 are disposed at least partially overlapping each other in a side view. The area with diagonal lines in FIG. 2 corresponds to the area where the console frame 32 overlaps the side support frame 42.

Figure 5:
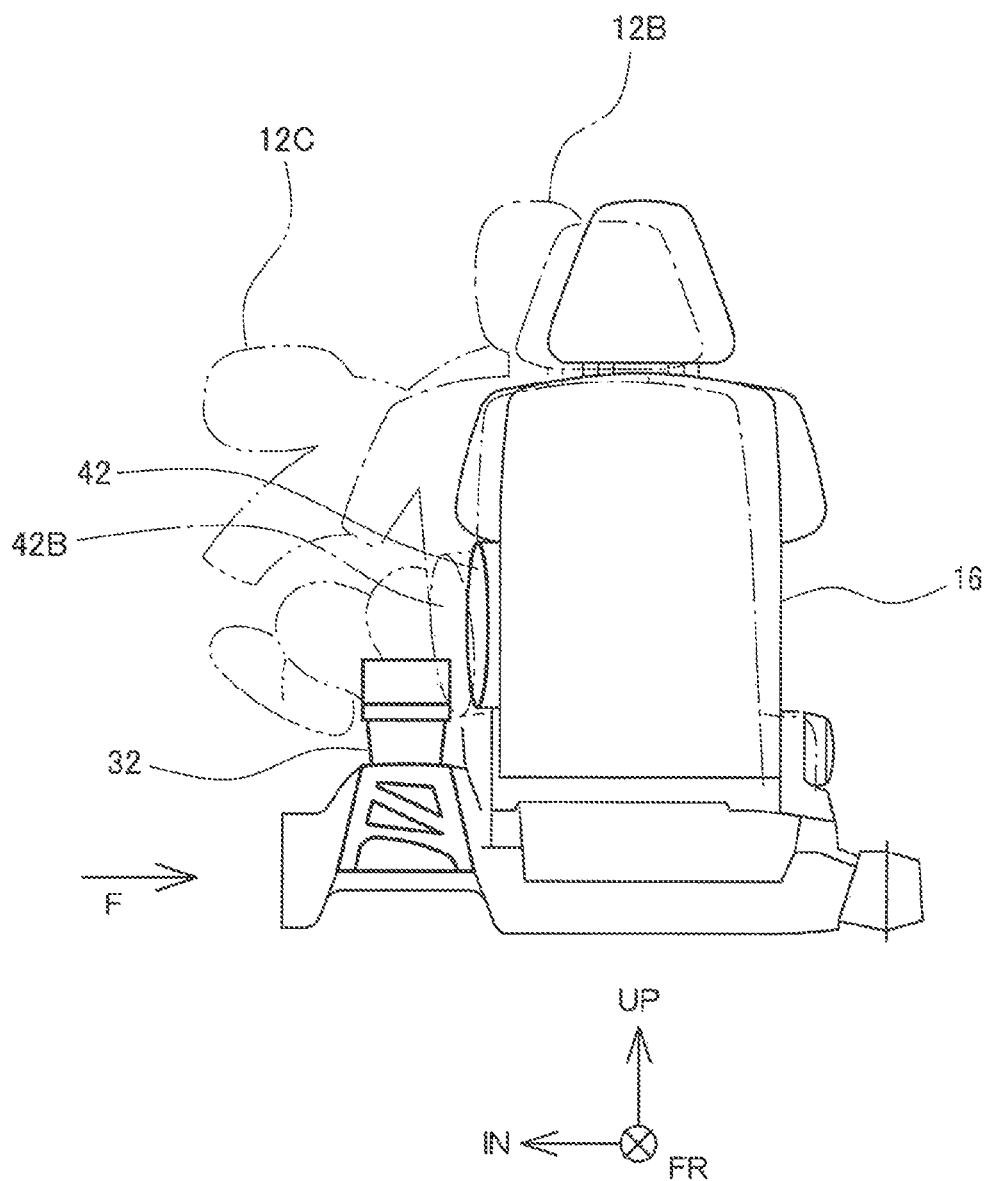
FIG. 5 schematically illustrates motions of a seat and of an occupant at a far-side collision.

FIGS. 4 and 5 illustrate motions of the seat 10 and the occupant 12 at a far-side collision. FIG. 4 illustrates a horizontal cross section including the side support frame 42 of the seat 10. FIG. 5 illustrates the seat 10 viewed from behind.

With an impact indicated by the arrow F in FIGS. 4 and 5 applied to the vehicle body at a far-side collision, the seat 10 and the occupant 12 will stay where they are due to inertia, and thus resultantly move relative to the vehicle body. In FIG. 4, the upper half body of the occupant 12; in particular, a part of the occupant 12 supported by the side support 20, moves to the position 12B outlined with an alternate long and short dash line. In FIG. 5, the occupant 12 will move to the position 12B outlined with an alternate long and short dash line and then to the position 12C outlined with a long dashed double-short dashed line. The side support 20 and the side support frame 42 receive an impact caused by the moving occupant 12, thus moving toward the inner side in the vehicle width direction. This motion causes the side support frame 42 to move to position 42B to abut against the console box 28 to be thereby supported by the console box 28 and the console frame 32 inside the console box 28, whereby the side support frame 42 is prevented from moving further. The side support frame 42, being supported by the console box 28 or the like, supports the upper half body of the occupant 12 to thereby prevent the upper half body from moving further. This structure enables a reduction in the amount of motion, or implementation of a small motion, of the occupant 12; in particular, of the head of the occupant at a far-side collision. Since the side support frame 42 is positioned closer to the console box 28 than is the seat back frame 36, the frame of the seat 10 abuts against the console box 28 at earlier timing at a far-side collision. This as well contributes to reduction in the amount of motion of the upper half body of the occupant 12.

A console box 28 without the console frame 32 therein can support the side support 20 provided that the console box 28 is sufficiently rigid, and can reduce the amount of motion of the occupant 12. Further, since incorporation of the console frame 32 enhances the rigidity of the console box 28, even a console frame 32 without overlap with the side support frame 42 in a side view can provide more reliable support for the side support 20 than the case without the console frame 32. That is, it is possible to reduce the amount of motion of the occupant 12.

The side support frame 42 can be mounted not only on a driver seat but also on other seats, such as a passenger seat.

The invention claimed is:

1. An interior structure of a vehicle, comprising:
a seat mounted in a cabin of the vehicle and having side supports, a seat frame, and a side support frame, the seat frame has a quadrangular shape having an inside vertical member and an outside vertical member, the side supports for supporting respective right and left lateral sides of an upper half body of an occupant, the side support frame incorporated in the side support on an inner side in a vehicle width direction and the side support frame directly secured to an outer surface of the inside vertical member of the seat frame, the side support frame extends more forward than the inside vertical member in a vehicle front-back direction, the outside vertical member does not have a side support frame secured thereon, the outside vertical member is positioned farther from a center line of the vehicle extending in the front-back direction of the vehicle than the inside vertical member, and
a console box adjacent to the seat, on an inner side of the seat in the vehicle width direction,
wherein the side support frame and the console box are positioned so as to at least partially overlap each other in a side view.

2. The interior structure of a vehicle according to claim 1, wherein the console box includes a console frame secured on a floor tunnel of the vehicle.

3. The interior structure of a vehicle according to claim 2, wherein the side support frame and the console frame are positioned so as to at least partially overlap each other in a side view.

4. The interior structure of a vehicle according to claim 1, wherein the seat is a driver seat.

5. The interior structure of a vehicle according to claim 1, wherein the side support frame includes a plurality of ribs and an enveloped outer shape defined by tip ends of the ribs.

6. An interior structure of a vehicle, comprising:
a seat mounted in a cabin of the vehicle and having side supports, a seat frame, and a side support frame, the seat frame has a quadrangular shape having an inside vertical member and an outside vertical member, the side supports for supporting respective right and left lateral sides of an upper half body of an occupant, the side support frame incorporated in the side support on an inner side in a vehicle width direction and the side support frame secured to the inside vertical member of the seat frame, the outside vertical member does not have a side support frame secured thereon, the outside vertical member is positioned farther from a center line of the vehicle extending in the front-back direction of the vehicle than the inside vertical member, and
a console box adjacent to the seat, on an inner side of the seat in the vehicle width direction,
wherein the side support frame and the console box are positioned so as to at least partially overlap each other in a side view, and
wherein the side support frame includes a plurality of ribs and an enveloped outer shape defined by tip ends of the ribs.

7. The interior structure of a vehicle according to claim 6, wherein the console box includes a console frame secured on a floor tunnel of the vehicle.

8. The interior structure of a vehicle according to claim 7, wherein the side support frame and the console frame are positioned so as to at least partially overlap each other in a side view.

9. The interior structure of a vehicle according to claim 6, wherein the seat is a driver seat.

\* \* \* \* \*